(12) United States Patent
Nemoto

(10) Patent No.: US 6,314,063 B1
(45) Date of Patent: Nov. 6, 2001

(54) INTEGRATED LIGHT EMITTING AND RECEIVING DEVICE AND OPTICAL PICK-UP WITH SAME

(75) Inventor: Kazuhiko Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,784

(22) Filed: Apr. 23, 1999

(30) Foreign Application Priority Data

Apr. 24, 1998 (JP) .................................................. 10-115693
Mar. 29, 1999 (JP) .................................................. 11-086892

(51) Int. Cl.$^7$ .................................................. G11B 7/09
(52) U.S. Cl. .................................. 369/44.12; 369/44.23; 369/44.44
(58) Field of Search .................. 369/44.12, 44.23, 369/44.41, 44.42, 44.14, 112

(56) References Cited

U.S. PATENT DOCUMENTS

| | | | |
|---|---|---|---|
| 4,897,828 | * | 1/1990 | Yoshitoshi et al. ................ 369/44.42 |
| 5,164,930 | * | 11/1992 | Sugiura .............................. 369/44.12 |
| 5,181,193 | * | 1/1993 | Kume et al. ........................ 369/44.23 |
| 5,727,111 | * | 3/1998 | Kume et al. ........................ 369/44.23 |
| 5,903,529 | * | 5/1999 | Nishi et al. ........................ 369/44.23 |
| 6,044,050 | * | 3/2000 | Kuroiwa ............................. 369/44.41 |
| 6,058,083 | * | 5/2000 | Araki ................................. 369/44.41 |

* cited by examiner

*Primary Examiner*—Thang V. Tran
(74) *Attorney, Agent, or Firm*—Sonnenschein, Nath & Rosenthal

(57) ABSTRACT

An integrated light emitting and receiving device capable of detection of the tracking condition and the focus condition by simple configuration and capable of reduction of the size of the semiconductor integrated circuit substrate on which the light receiving elements are formed, provided with a laser diode as a light emitting element formed on the substrate for outputting light in a predetermined direction, a prism as a light splitting means for outputting the light of the laser diode to the optical disc, focusing the reflected light onto a first photodetector, and focusing the light reflected at the first photodetector to a second photodetector by a predetermined optical path, a tracking condition means for detecting the tracking condition only from the information of the amount of the received light of the first photodetector, and a focus condition detecting means for detecting the focus condition only from the information of the amount of received light of the second photodetector.

14 Claims, 21 Drawing Sheets

RECORDING TRACK DIRECTION

RECORDING TRACK DIRECTION

RECORDING TRACK DIRECTION

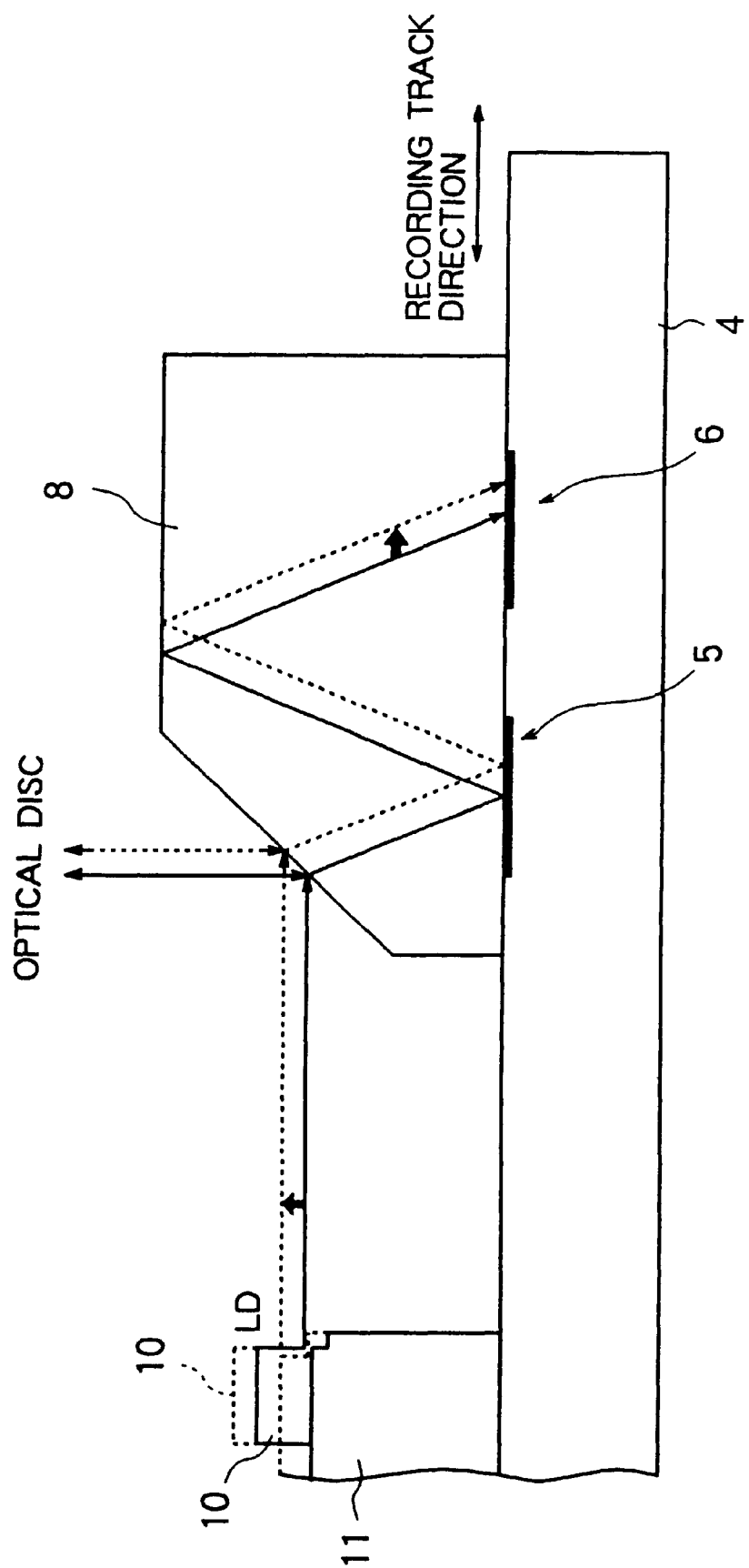

INTEGRATED LIGHT EMITTING AND RECEIVING DEVICE AND OPTICAL PICK-UP WITH SAME

RELATED APPLICATION DATA

The present application claims priority to Japanese Application Nos. P10-115693 filed Apr. 24, 1998 and P11-086892 filed Mar. 29, 1999, which applications are incorporated herein by reference to the extent permitted by law.

BACKGROUND OF THE INVENTION

1. Field of the Invention

The present invention relates to an integrated light emitting and receiving device and an optical pick-up for emitting light to a recording medium, receiving reflected light modulated by pits formed on the recording medium, and detecting the focus condition and tracking condition based on the information of the reflected light.

2. Description of the Related Art

Recently, various kinds of recording media including recording media using a change of reflectance, optomagnetic recording media, and the like have been developed and proposed. Various kinds of optical disc players have been proposed and standardized.

In compact disc (CD), compact disc-read only memory (CD-ROM), and other so-called phase type optical disc players, the standards call for the depth of the pits formed in the optical disc to be about ⅕ of the wavelength of light.

On the other hand, in digital versatile disc (DVD), digital versatile disc-read only memory (DVD-ROM), and other more recent optical disc players, the standards call for the depth of the pits to be about ¼ of the wavelength of light.

In the above optical disc players, it is necessary to control the tracking servo system so as to make a laser spot follow the recording track of the optical disc and to control the focus servo system so as to keep the laser spot focused on the optical disc.

The tracking error signal and focus error signal for the tracking servo system are detected by for example an optical pick-up.

For example, as shown in FIG. 1, an optical picks-up is comprising of an object lens 2 arranged facing an optical disc 1 and a so-called laser coupler 3 hybridized for reducing the size and cost.

The laser coupler 3 has the structure illustrated in FIG. 2 and FIG. 3. In the laser coupler 3 shown in FIG. 2 and FIG. 3, a prism 8 and a photodiode 11 are mounted on a semiconductor integrated circuit substrate 4 on which two photodetector 5 and 6 are formed.

In the photodiode 11, a photodetector 12 for monitoring the laser output is formed. A laser diode 10 is mounted on the photo diode 11.

The laser diode 10 outputs a laser beam to the beam splitting face 8a of the prism 8 and outputs a laser beam for auto power control (APC) to the laser which automatically controls the output of the laser diode 10. The laser beam is received by the photodetector 12. The laser beam output to the beam splitting face 8a of the prism 8 is reflected on the beam splitting face 8 and is focused on the signal face of the optical disc 1 through the object lens 2.

The light is influenced by the pits of the optical disc 1 and is reflected to enter into the beam splitting face 8a through the same path.

The reflected light entering into the beam splitting face 8a is focused on the photodetector 5 and the reflected light on the photodetector 5 is reflected on the reflection face 8b to enter the photodetector 6.

When obtaining a tracking error signal by the so-called push-pull method and obtaining a focus error signal by the so-called differential spot size method in a CD, CD-ROM, or other optical disc player, it is possible to adopt the configuration for example shown in FIG. 4.

In FIG. 4 the photodetectors 5 and 6 are each split into four light receiving regions a to d, i to e. The spot S of the reflected light strikes all of the receiving light receiving regions.

Note that the push-pull method features a very simple configuration and since basically a one-spot optical system is sufficient does not need grating such as in the so-called three-beam method.

If the tracking error signal is TE, the focus error signal is FE, and the amounts of the received light of the receiving light regions a to d and i to l are Ma to Md and Mi to Ml, the tracking error signal TE and the focus error signal FE can be calculated by the following equations (1) and (2):

$$FE=[(Ma+Md)-(Mb+Mc)]-[(Mi+Ml)-(Mj+Mk)] \quad (1)$$

$$TE=[(Ma+Mb)-(Mc+Md)]+[(Mk+Ml)-(Mi+Mj)] \quad (2)$$

An information signal RF recorded on the optical disc 1 can be calculated by the following equation (3):

$$RF=Ma+Mb+Mc+Mc+Md+Mi+Mj+Mk+Ml \quad (3)$$

On the other hand, in DVD, DVD-ROM, or other the optical disc player, as mentioned above, the depth of the pits of the disc is about ¼ of the wavelength λ of the laser beam.

Therefore, if obtaining the tracking error signal TE by the above push-pull method, the component [(Ma+Mb)−(Mc+Md)]+[(Mk+Ml)−(Mi+Mj)] of the push-pull signal becomes so small that the tracking error signal cannot be obtained.

SUMMARY OF THE INVENTION

An object of the present invention is to provide an integrated light emitting and receiving device capable of reducing the number of regions of the light receiving elements, detecting the focus condition and tracking condition by simple configurations, and reducing the size of a semiconductor integrated circuit substrate on which the light receiving elements are formed.

According to the present invention, there is provided an integrated light emitting and receiving device for emitting light to a recording medium on which a plurality of pits are formed, focusing the light on the recording medium, receiving the reflected light influenced by the pits, and detecting a focus condition and tracking condition of the light focused on the recording medium in accordance with the information of the reflected light, comprising first and second light receiving elements which are provided on a substrate and are divided into a plurality of light receiving regions; a light emitting element which is provided on the substrate and emits light in a predetermined direction; a light splitting means which is provided on the first and second light receiving elements, emits the light input from the light emitting element to the recording medium, focuses the reflected light from the recording medium onto the first light receiving element, and focuses the reflected light reflected from the first light receiving element onto the second light receiving element; a tracking condition detecting means for detecting the tracking condition only from information on the amounts of light received by the light receiving regions of the first light receiving element; a focus condition detecting means for detecting the focus condition only from information on the amounts of light received by the light receiving regions of the second light receiving element.

In the integrated light emitting and receiving device according to the present invention, the information of the amounts of received light of the first light receiving element and the second light receiving element are respectively used to detect the tracking condition and the focus condition. Therefore, since it is unnecessary to duplicately divide the first and second light receiving elements for detecting the tracking condition and the focus condition, it becomes possible to reduce the number of light receiving regions of the light receiving elements.

That is, in the first light receiving element, it is possible to provide the minimum number of light receiving regions for detecting the tracking condition, while in the second light receiving element, it is possible to provide the minimum number of light receiving regions for detecting the focus condition.

As the result, the configuration for detecting the tracking condition and the focus condition is simplified.

Alternatively, preferably the first light receiving element is divided into four light receiving regions along with the longitudinal direction and the transversal direction of the substrate.

More preferably, the tracking condition detecting means detects the tracking condition by a phase comparing circuit for calculating a phase difference of a change of the amounts of light received between the light receiving regions located at diagonal positions among the four light receiving regions and an adding circuit for adding the phase differences of changes of the amounts of received light calculated by the phase comparing circuit.

According to these configurations, by dividing the first receiving element into light receiving regions in this way, the tracking condition can be detected by the so-called differential phase detection (DPD) method.

Alternatively, preferably the light receiving element is divided into four light receiving regions along two mutually crossing directions not along the longitudinal direction and transversal direction of the substrate.

More preferably, the focus condition detecting means detects the focus condition by an adding circuit for calculating the sum of the amounts of received light of the light receiving regions located at diagonal positions among the four light receiving regions and a subtraction circuit for calculating the difference between the amounts of received light.

According to these configurations, by dividing the second light receiving element into light receiving regions in this way, the focus condition can be detected by the so-called astigmatism method.

Alternatively, preferably, the second light receiving element is divided into two light receiving regions.

More preferably, the focus condition detecting means detects the focus condition by a subtraction circuit for calculating the difference of the amounts of received light of the two light receiving regions.

Further, more preferably the light splitting means has a beam splitting face for reflecting the light emitted from the light emitting elements onto the recording medium and passing the reflected light from the recording medium and a reflection face for reflecting the reflected light of the light focused on the first light receiving element through the beam splitting face to the second light receiving element.

According to this configuration, by dividing the second light receiving element into the light receiving regions in this way, the focus condition can be detected by the so-called knife edge method.

BRIEF DESCRIPTION OF THE DRAWINGS

These and other objects and features of the present invention will become clearer from the following description of the preferred embodiments given with reference to the accompanying drawings, in which:

FIG. 14 is a view of the principle of the movement of the position of formation of a spot on the photodetector due to a fluctuation in the height position of a light emitting point of the laser diode;

DESCRIPTION OF THE PREFERRED EMBODIMENTS

Below, a detailed explanation will be given of preferred embodiments of the present invention with reference to the drawings.

First Embodiment

Figure 5:
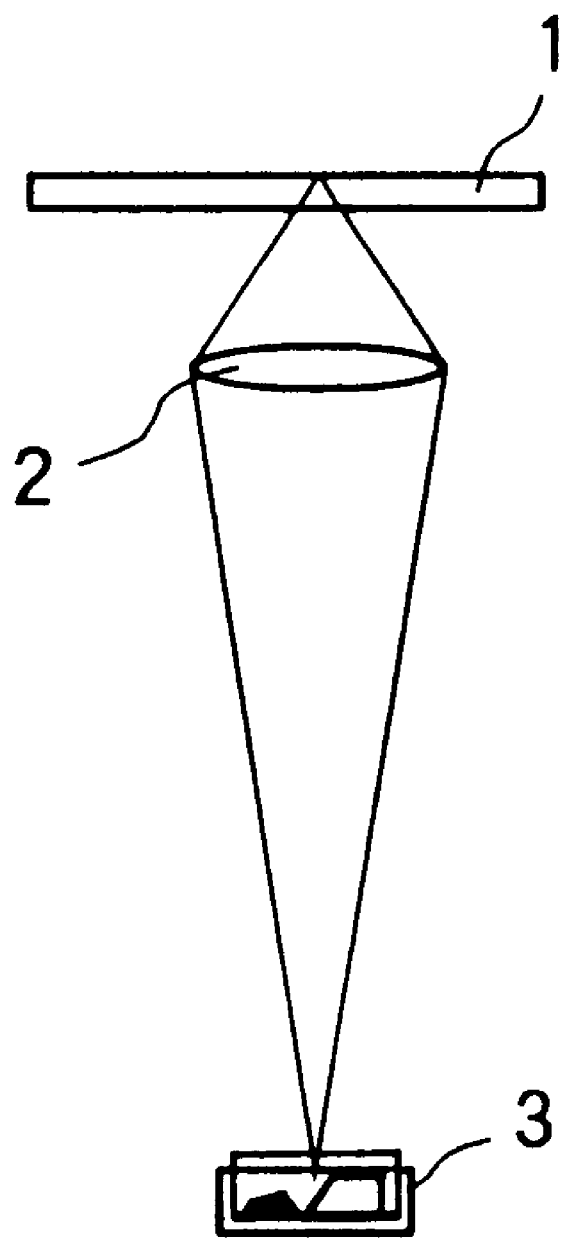
FIG. 5 is a view of an example of the pick-up to which the present invention is adopted.

FIG. 5 is a view of an example of the configuration of an optical pick-up to which the present invention is applied.

Figure 6:
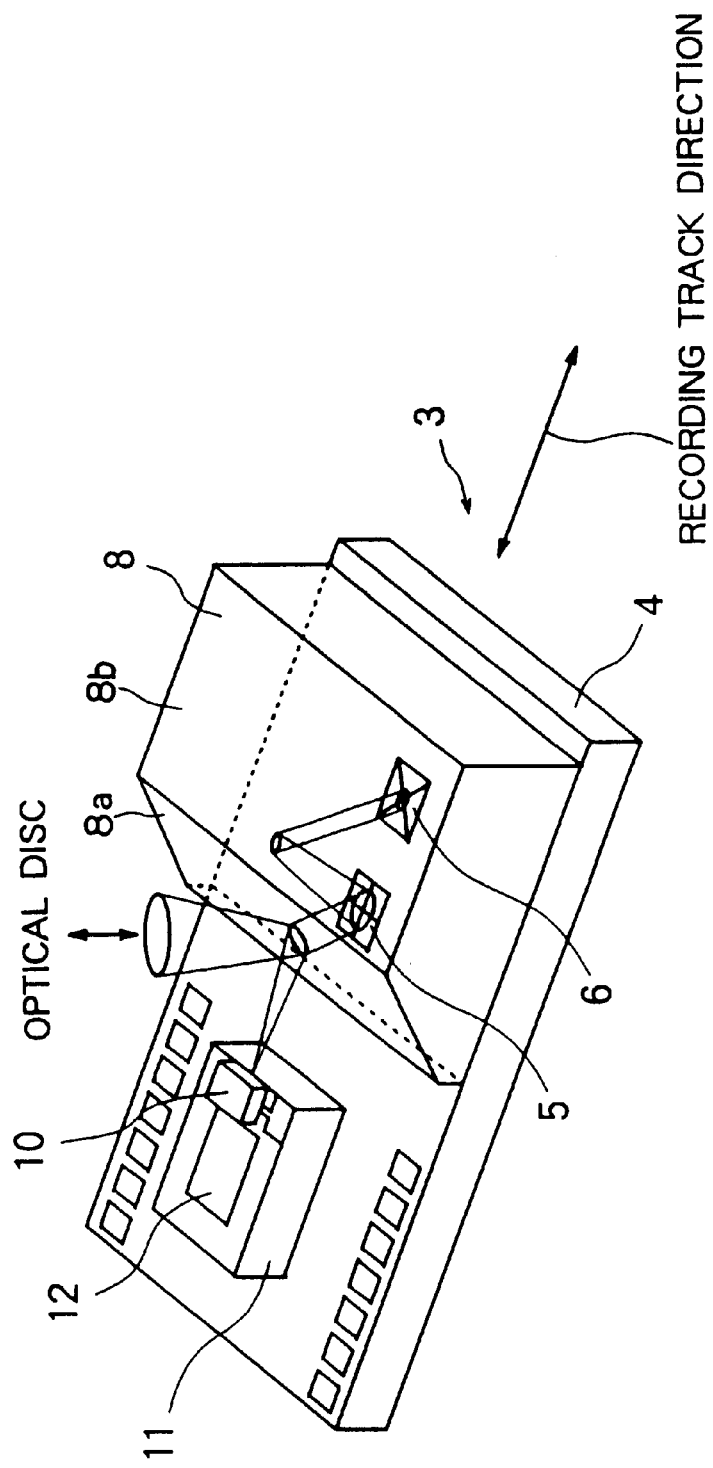
FIG. 6 is a perspective view of an embodiment of a laser coupler as an integrated light emitting and receiving device according to the present invention.
Figure 7:
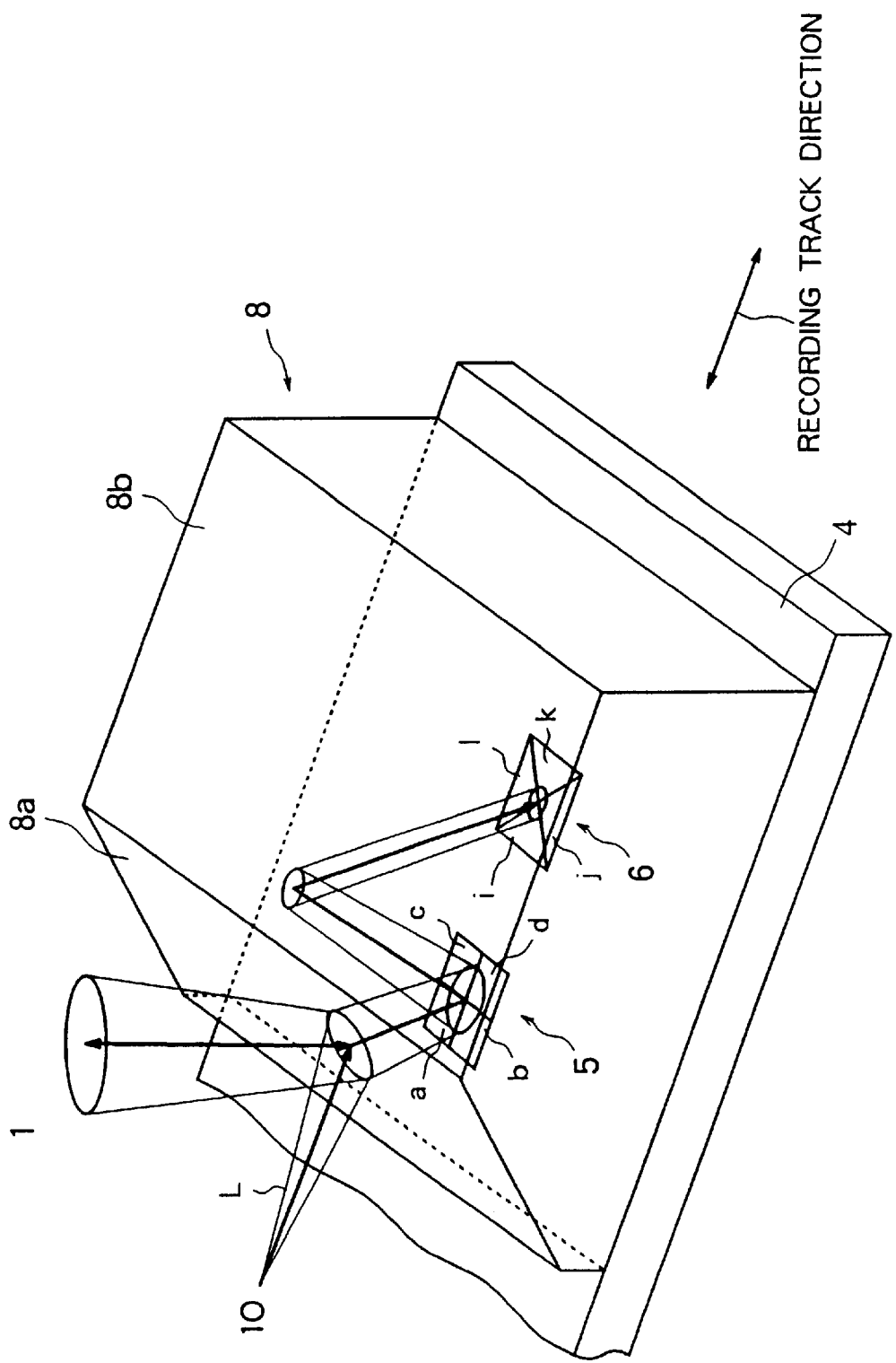
FIG. 7 is a perspective view showing the area around the laser coupler shown in FIG. 5 enlarged.

FIG. 6 and FIG. 7 are views of a laser coupler as an integrated light emitting and receiving devices according to the first embodiment of the present invention. FIG. 6 is a perspective view and FIG. 7 is a perspective view of the area around a prism enlarged.

Note that the optical pick-up illustrated in FIG. 5 is comprised of an object lens 2 arranged facing an optical disc 1 and a laser coupler. The basic configuration of the laser coupler 3 as the integrated light emitting and receiving device according to the present embodiment is similar to the laser coupler 3 explained in FIG. 2 and FIG. 3. Below, the same components are given the same reference numerals.

Here, to obtain a tracking error signal in a DVD, DVD-ROM, or other optical disc player, it is known to use for example the so-called differential phase detection (DPD) method. The method features resistance to fluctuations in the depth of the pits of the optical disc, resistance even to movement of the laser beam spot on a photodetector, and acquisition of a stable tracking signal without offset by one spot.

Figure 4:
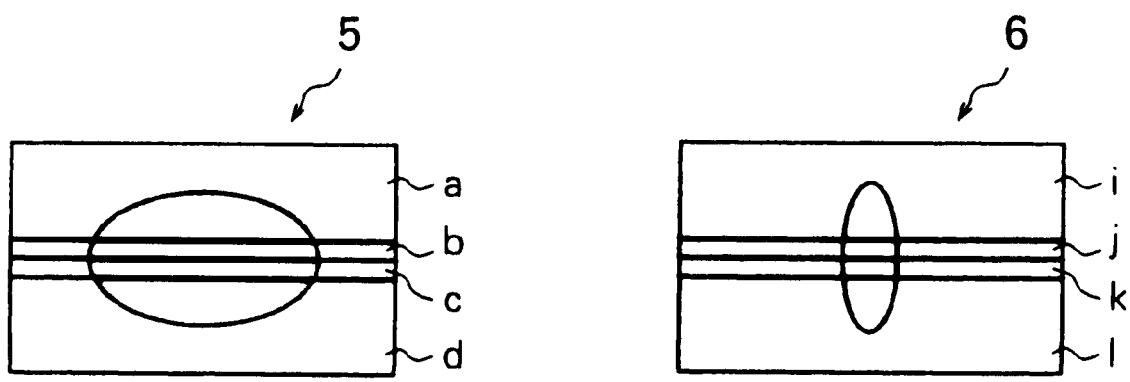
FIG. 4 is a view of the shape of the photodetector of the laser coupler shown in FIG. 2.
Figure 8:
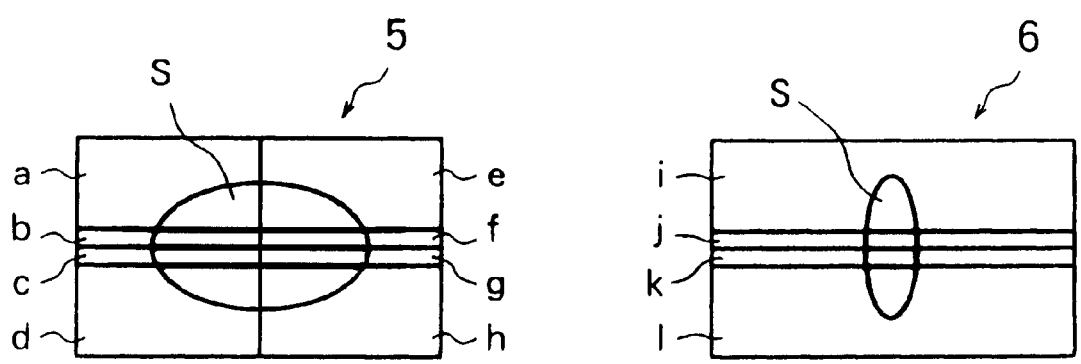
FIG. 8 is a view of dividing regions in a photodetector of the related art by the DPD method.

Specifically, in the DPD method, as shown in FIG. 8, the photodetector 5 shown in FIG. 4 is divided from the center into eight light receiving regions a to h.

Figure 9A:
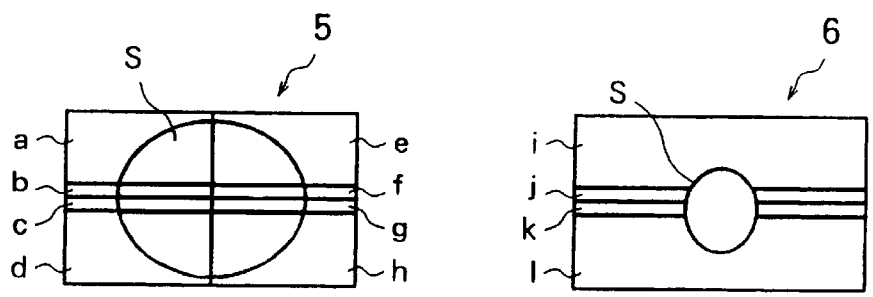
FIGS. 9A to 9C are views of a shape of a laser spot on the photodetector shown in FIG. 8.
Figure 9B:
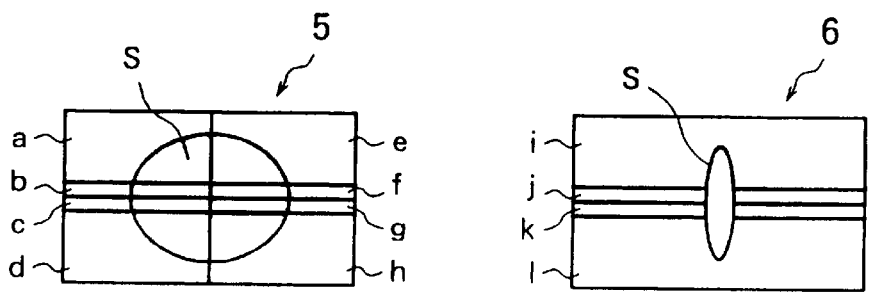
Figure 9C:
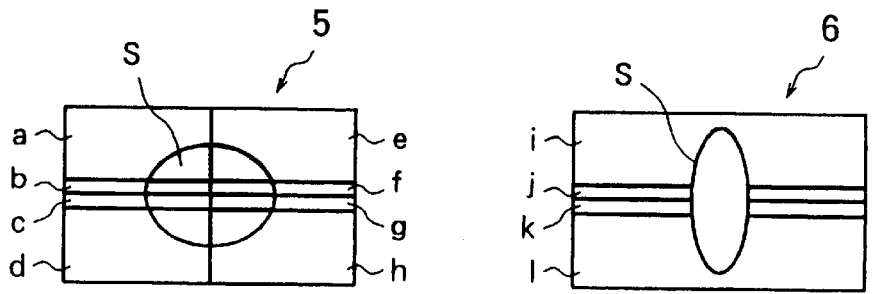

In this case, the laser spot S is formed on the photodetectors 5 and 6, for example, as shown in FIGS. 9A to 9C.

FIG. 9A shows a case where the recording face of the optical disk 1 is closer than the in-focus position of the optical system, FIG. 9B shows a case where the recording face is at the in-focus position of the optical system, and FIG. 9C shows a case where the recording face is further than the in-focus position of the optical system.

Figure 10:
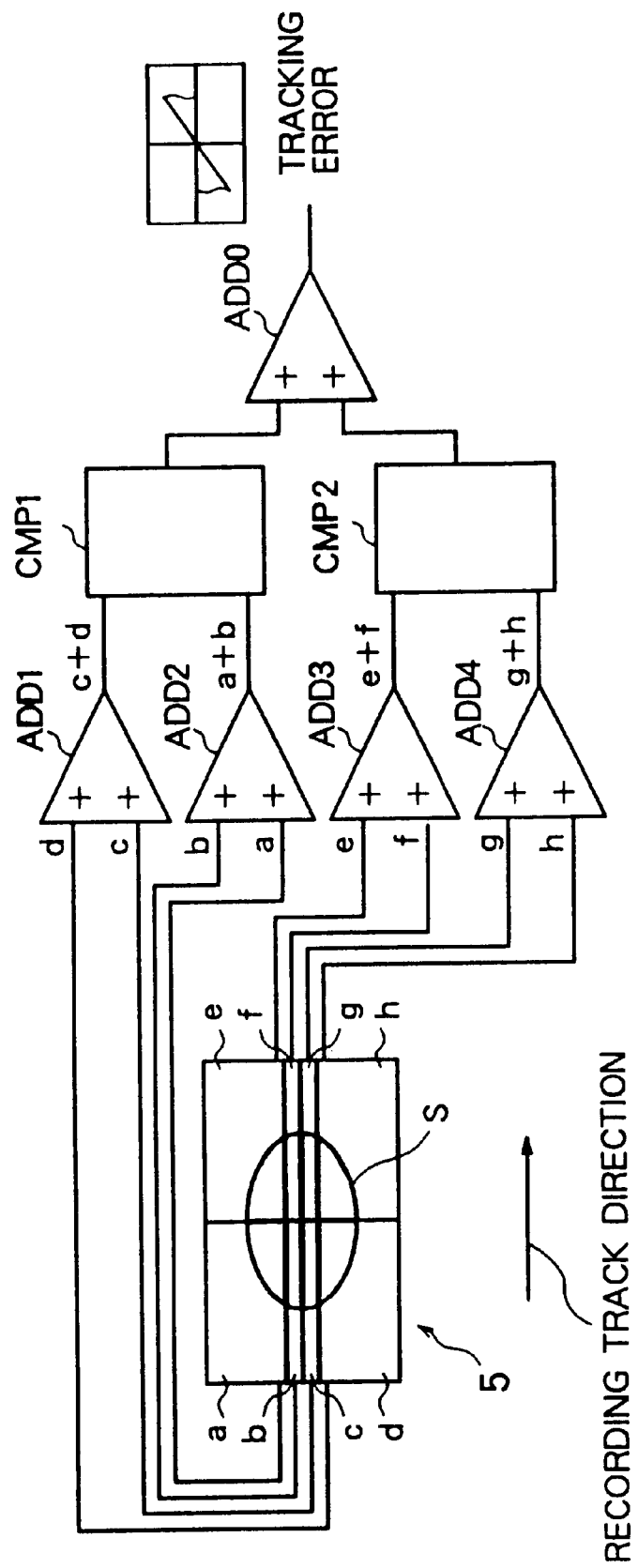
FIG. 10 is a view of an example of a circuit for generating a tracking error signal by the DPD method.

The amounts of light received at the light receiving regions a to h of the photodetector 5 can be used to obtain the tracking error signal TE by the circuit shown in FIG. 10.

Note that the circuit shown in FIG. 10 is formed on the semiconductor integrated circuit substrate 4.

The adders ADD1 to ADD4 shown in FIG. 10 generate sum signals (Ma+Mb), (Mc+Md), (Me+Mf), and (Mg+Mh) of the amounts of received light of the light receiving regions (a, b), (c, d), (e, f), and (g, h). Phase comparators CMP1 and CMP2 compare the phase between these sum signals and output phase differences. The adder ADD0 adds the phase differences and outputs the tracking error signal TE.

Note that the focus error signal FE and RF signal in this case are calculated from the following equations (4) and (5).

$$FE=[(Ma+Md+Me+Mh)-(Mb+Mc+Mf+Mg)]-[(Mi+Ml)-(Mj+Mk)] \quad (4)$$

$$RF=Ma+Mb+Mc+Mc+Md+Mi+Mj+Mk+Ml \quad (5)$$

When obtaining the tracking error signal TE and the focus error signal FE by the above laser coupler, as shown in FIG. 8, the photodetector 5 is divided into eight light receiving regions and the photodetector 6 into four.

If the number of light receiving regions are increased, so-called carrier crosstalk easily occurs. This is especially so in a high sensitivity photodetector of a thick growth film. This is disadvantageous in increasing the speed of the photodetector. Further, since the increase of the number of regions makes the circuit configuration shown in FIG. 10 complicated and large and increases the number of amplifiers for amplifying the amounts of the received light detected by the light receiving regions, there is the disadvantage that reduction of the size of the semiconductor integrated circuit substrate 4 is difficult.

On the other hand, in FIG. 6, the substrate 4 is formed with a photodetector 5 as a first light receiving element and a photodetector 6 as a second light receiving element separately at a predetermined distance. A prism 8 serving as a light splitting means is mounted over the formation regions of photodetectors 5 and 6 of the substrate 4.

A photodiode 11 is mounted in the region facing the prism 8 on the substrate 4. The photodiode 11 is formed with a photodetector 12 for monitoring the laser output. The photodiode 11 also has a laser diode 10 mounted on it as a light emitting element.

The laser diode 10 outputs a laser beam L to the beam splitting face 8a of the prism 8.

Note that the outputs of the laser diode 10 are controlled to become constant by the APC.

The prism 8 is made of a material passing light and consists of a body having for example seven faces.

Further, among the seven faces, the face inclined 45° facing the direction of output of the laser beam of the laser diode 10 is formed with a beam splitting film which serves as the beam splitting face 8a.

The beam splitting face 8a reflects the laser beam L input from laser diode 10 onto the optical disc 1 and guides the reflected light from the optical disc 1 into the prism 8.

The top face of the prism 8 is formed with a high reflection film and serves as a reflection face 8b.

The reflection face 8b is provided for reflecting the light which passes through the beam splitting face 8a and strikes and is reflected from the optical disc 1 at the photodetector 5 to reflect the reflected light further toward the photodetector 6.

The prism 8 bends the light passing through the beam splitter face 8a and reflected from the optical disc 1 and makes it converge on the photodetector 5. The light reflected at the photodetector 5 is reflected at the reflection face 8b and led to the light receiving face of the photodetector 6. At this time, since the beam splitting face 8a is inclined with respect to the reflected light, astigmatism occurs in the reflected light. Further, since the focal points of the reflected light in the longitudinal direction and transversal direction of the substrate 4 no longer match, the light receiving face of the photodetector 6 is positioned between the focal points of the reflected light in the longitudinal direction and transversal direction of that Due to this configuration, it becomes possible to detect focus error by the astigmatism method.

As shown in FIG. 7, the photodetector 5 has a rectangular light receiving region which is split equally into four light receiving regions a to d along the recording track direction and the direction perpendicular to the recording track direction. The photodetector 6 has a rectangular light receiving region which is split substantially equally into four along two intersecting directions - not along the recording track direction and the direction perpendicular to it.

Figure 11A:
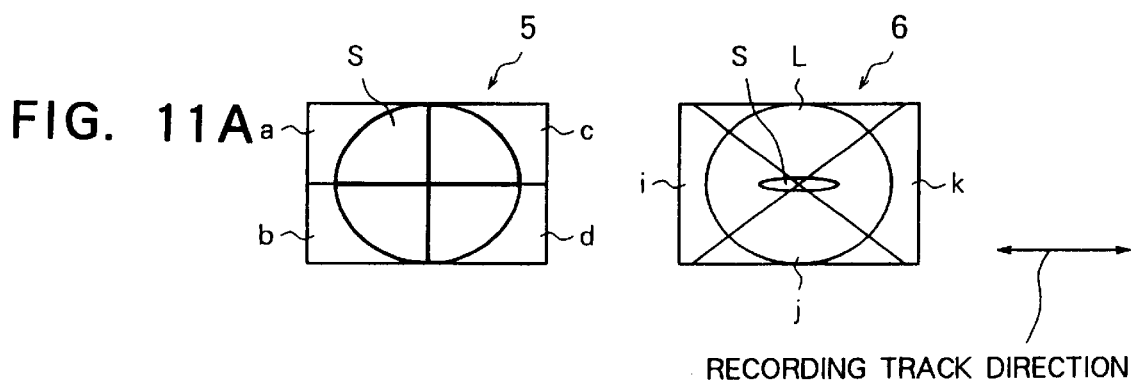
FIGS. 11A to 11C are views of the shape of a laser spot formed on the photodetector 5 and 6 of the laser coupler according to the first embodiment.
Figure 11B:
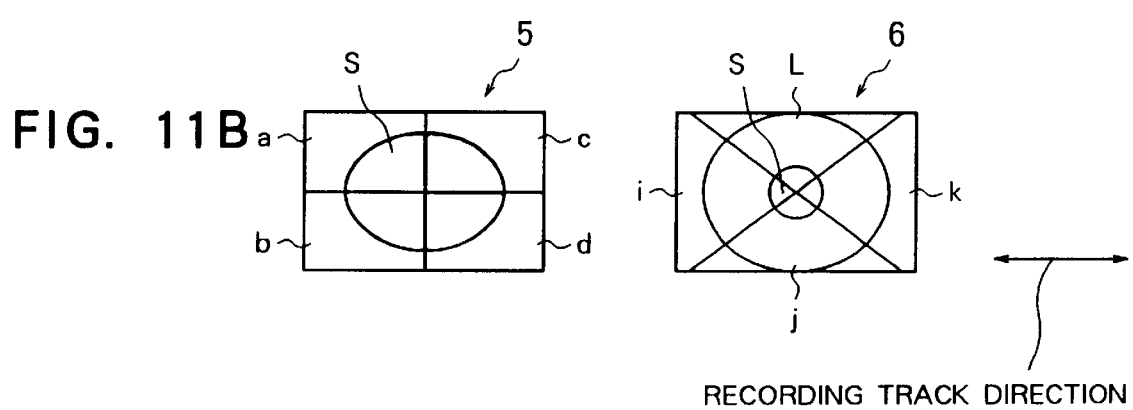
Figure 11C:
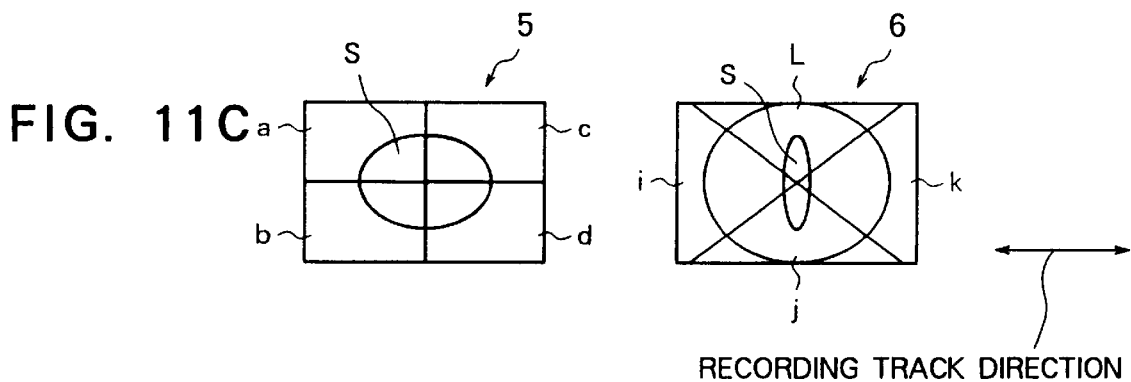

Here, FIGS. 11A to 11C are views of laser beam spots formed on the photodetectors 5 and 6 of the above laser coupler. FIG. 11A shows the state where the recording face of the optical disc 1 on which the pits are formed is too close to the object lens 2, FIG. 11B shows the state where the focal point of the object lens is on the recording face of the optical disc 1 on which the pits are formed, and FIG. 11C shows the state where the recording face of the optical disc 1 on which the pits is too far from the object lens 2.

In the state where the focal point of the object lens 2 is on the recording face of the optical disc 1 on which the pits are formed, as shown FIG. 11B, the spot S formed on the photodetector 5 is set to be a relatively large oval shape.

On the other hand, the spot S formed on the photodetector 6 is set to be a substantially round shape.

As shown in FIG. 11A, when the recording face of the optical disc 1 on which the pits are formed is too close to the object lens 2, due to the function of the prism 8, the spot S converged on the photodetector 5 becomes a further larger round shape than the state shown in FIG. 11B. The spot S focused on the photodetector 6 becomes an oval shape long in the recording track direction due to the astigmatism.

Further, as shown in FIG. 11, in the case where the recording face of the optical disc 1 on which the pits are formed is too far from the object lens 2, the shape of the spot S formed on the photodetector 5 becomes a smaller oval shape than the state shown in FIG. 11B and the spot S formed on the photodetector 6 becomes an oval shape long in the vertical direction to the recording track direction due to the astigmatism.

In the laser coupler according to the present embodiment, the tracking error signal TE is detected by the so-called DPD method.

Figure 12:
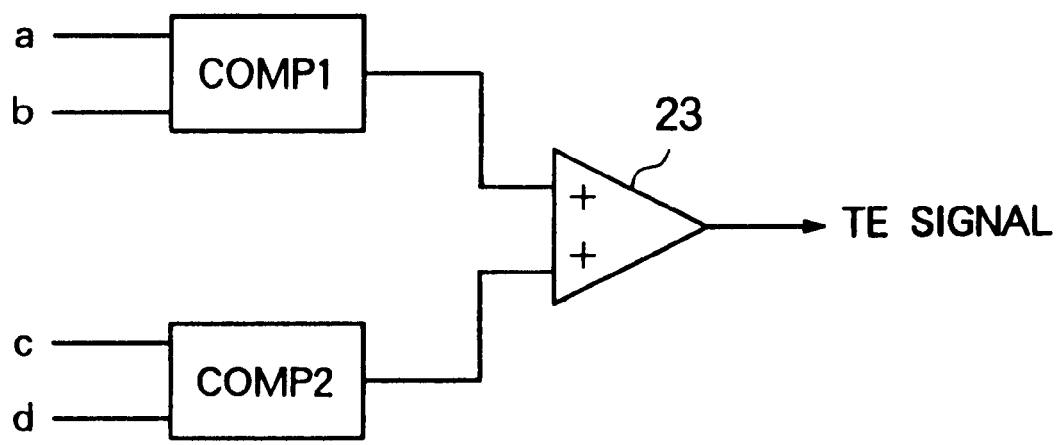
FIG. 12 is a view of an example of a circuit for calculating a tracking error signal by the DPD method.

Specifically, if the amounts of received light of the light receiving regions a to d of the photodetector 5 are Ma to Md, as shown in FIG. 12, the tracking error signal TE is obtained by comparing the phases between Ma and Mb, Md and Mc at the phase comparator CMP1, CMP2 and adding the difference of these phases at the adder 23.

That is, the sums (Ma+Md) and (Mb+Mc) of the amounts of received light of the light receiving regions a, d and b, c located at diagonal positions become substantially equal when the pick-up is correctly tracking, but when not correctly tracking, a phase difference occurs between (Ma+Md) and (Mb+Mc). Further, the polarity of the phase difference inverts when not correctly tracking in the opposite direction.

Accordingly, the tracking error signal TE can be obtained.

The circuit is formed, for example, in the semiconductor integrated circuit substrate 4.

On the other hand, in the laser coupler according to the present embodiment, the focus error signal FE is detected by the so-called astigmatism method.

Specifically, the focus error signal FE is generated by the following equation (6) from the amount of received light detected by the photodetector 6.

Note that the amounts of received light of the light receiving regions i to 1 of the photodetector 6 are Mi to Me.

$$FE=(Mi+Mk)-(Ml+Mj) \quad (6)$$

That is, the sums of the amounts of received light (Mi+Mk) and (Mj+Me) of the light receiving regions i, k and j, l located at diagonal positions become substantially equal at the time of focus, but when focus is lost, a difference will occur in the amounts of the received light.

Further, the polarity of the difference of the amounts of received light reverses when the focus is lost.

Accordingly, the focus error signal FE can be generated.

Figure 13:
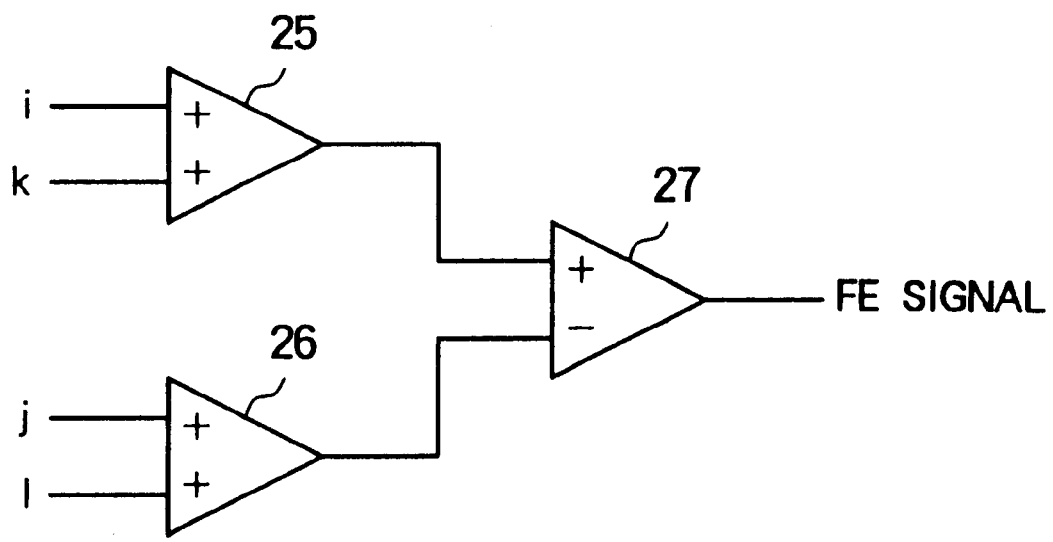
FIG. 13 is a view of an example of a circuit for calculating a focus error signal by the astigmatism method.

FIG. 13 shows the circuit for executing equation (6). This circuit has an adder 25, 26 and subtracter 27. The circuit is formed for example on the substrate 4.

As explained above, in the laser coupler according to the present embodiment, the tracking error signal TE is generated by the DPD method in accordance with the information of the amount of received light of the photodetector 5, and the focus error signal FE is generated by the astigmatism method in accordance with the information of the amount of received light of the photodetector 6.

Accordingly, for example, as explained in FIG. 8 and FIG. 10, it is possible to reduce the number of regions the photodetectors are divided into compared with the configuration where the tracking error signal TE and the focus error signal EF are generated by using the information of both the photodetectors 5 and 6.

As a result, it is possible to simplify the configuration of the circuit for generating the tracking error signal TE and the focus error signal TE.

Further, in the present embodiment, since the tracking error signal TE and the focus error signal FE can be obtained by one spot S, grating become unnecessary and it is possible to simplify the configuration of the laser coupler.

Further, in the present embodiment, the light receiving face of the photodetector 6 is located between the focal points in the longitudinal direction and the transversal direction of the semiconductor integrated circuit substrate 4. Note that the configuration can be realized for example by adjusting the distance between the prism 8 and laser diode 10.

Accordingly, the spot S focused on the photodetector 5 becomes relatively large compared with for example that shown in FIG. 11 and FIG. 9. Therefore, the present embodiment has the following features.

For example, the height position of the laser diode 10 mounted on the photodiode 11 is changeable up and down as shown in FIG. 14 in accordance with the precision of assembly to the semiconductor integrated circuit substrate 4.

If the position of the laser diode 10 is shifted up and down, for example, as shown in FIG. 15, the position of the spot S formed on the photodetector 5 also moves.

Figure 15A:
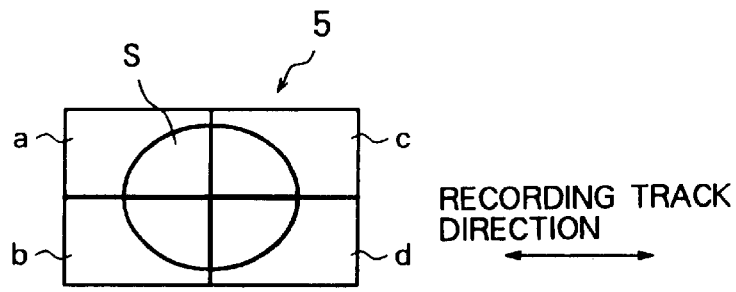
FIG. 15 is a view of a movement of the position of formation of a spot on the photodetector due to a fluctuation in height position of a light emitting point of the laser diode in the laser coupler according to the first embodiment.
Figure 15B:
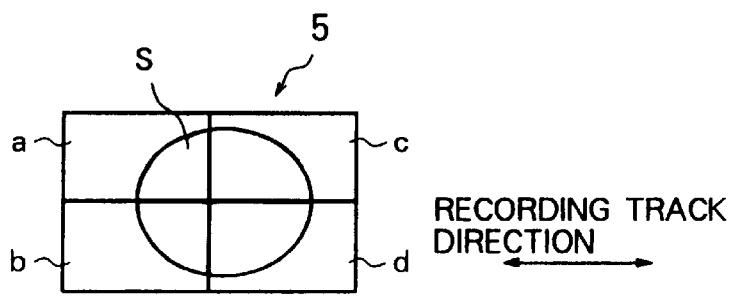

FIG. 15A is a view of a case where the height of the laser diode 10 to the semiconductor integrated circuit 4 is optimum, FIG. 15B is a view of a case where the height of the laser diode 10 to the semiconductor integrated circuit 4 is higher than a predetermined position.

As shown in FIG. 15B, the position of the spot S formed on the photodetector 5 moves in the recording track direction.

Figure 1:
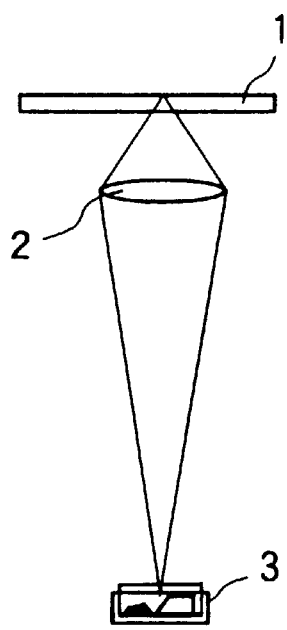
FIG. 1 is a view of an example of the configuration of an optical pick-up.
Figure 2:
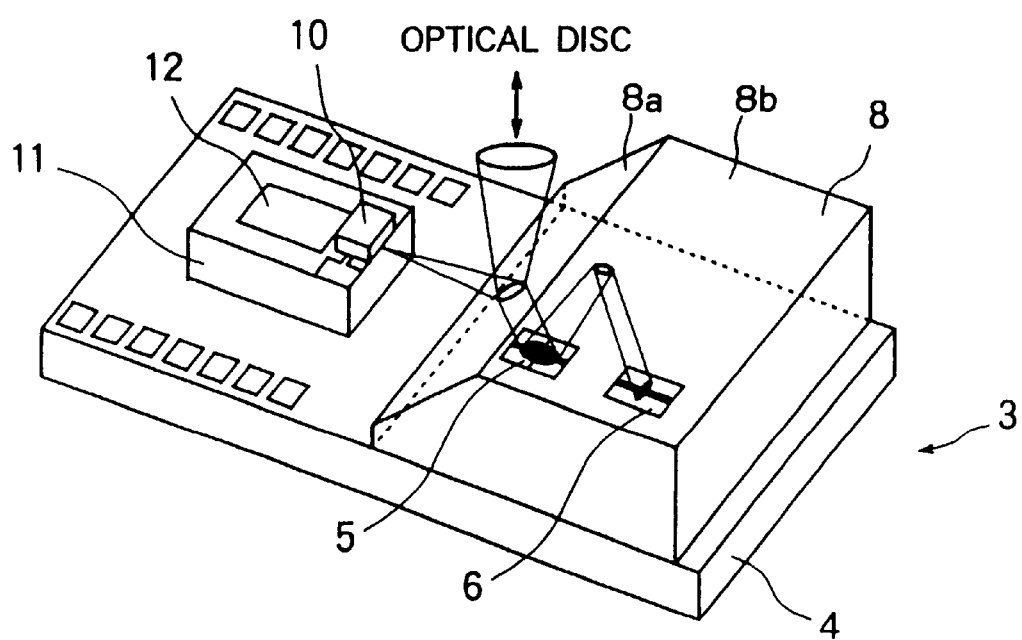
FIG. 2 is a perspective view of an example of a laser coupler.
Figure 3:
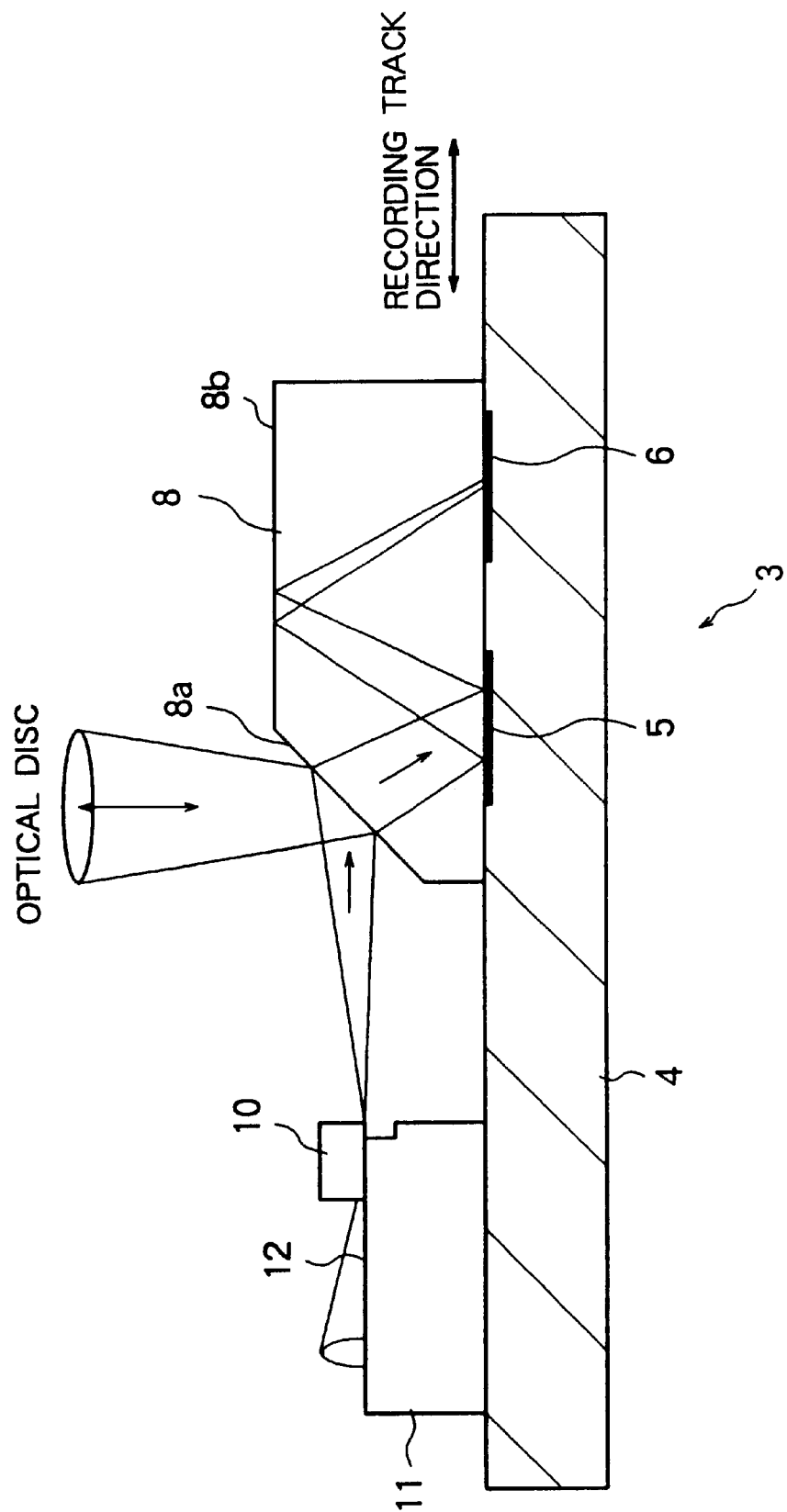
FIG. 3 is a sectional view of the laser coupler shown in FIG. 2.

On the other hand, in the laser coupler shown in FIG. 2, the position of the focal point in the transversal direction of the substrate 4 is set to be on the top surface of the prism 8, and the position of the focal point in the longitudinal direction is set to be on the photodetector 5.

Therefore, the size of the spot S formed on the photodetector 5 is smaller than the case of FIG. 15.

Figure 16A:
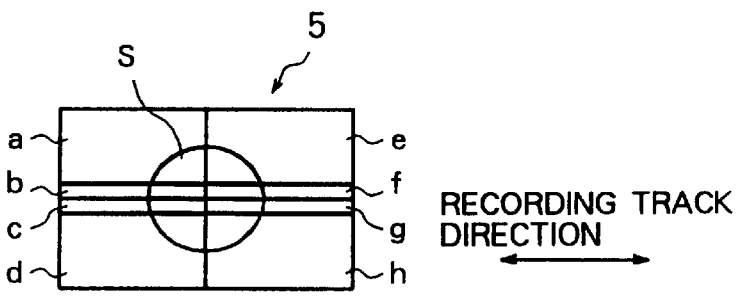
FIG. 16 is a view of movement of the position of formation of a spot on the photodetector due to a fluctuation in the height position of a light emitting point of the laser diode in the laser coupler shown in FIG. 2.
Figure 16B:
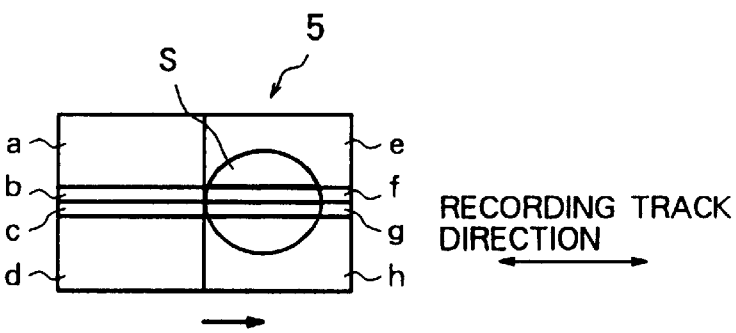

Accordingly, as shown in FIG. 16, in response to the change of the light of the laser diode 10, the spot S moves easily from the normal position shown in FIG. 16A to the position shown in FIG. 16B.

If the spot S moves to the position shown in FIG. 16B, it becomes impossible to detect the tracking error signal. In the case of the present embodiment, since the spot S is large under the same condition, the detectable extent of the tracking error signal is relatively wide.

In the above embodiment, since the size of the spot S formed on the photodetector 5 is relatively large, it is possible to ease the requirements for positional accuracy in the height direction of the laser diode 10 at the time of assembly of the laser coupler.

Second Embodiment

Figure 17:
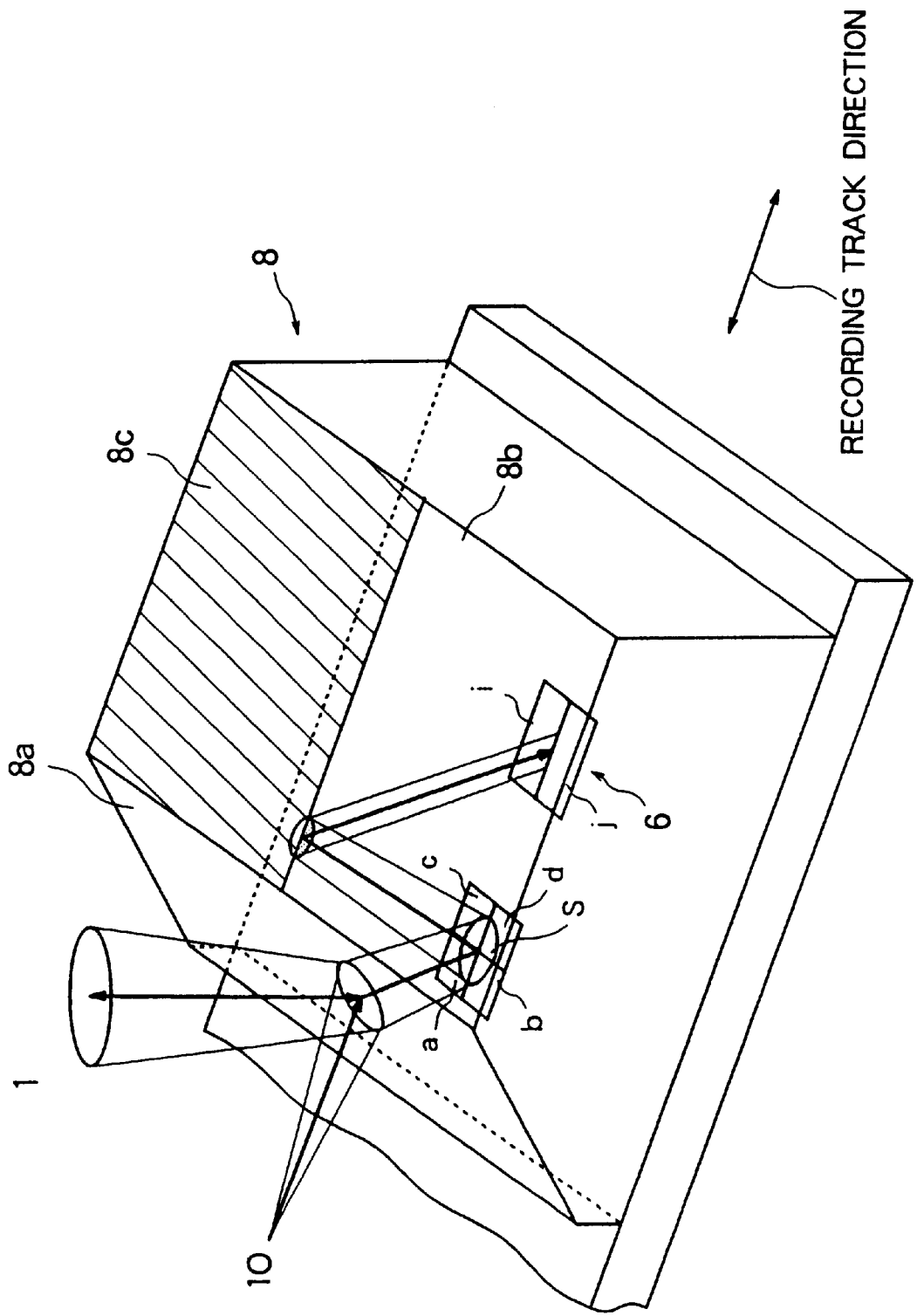
FIG. 17 is a perspective view of a laser coupler as an integrated light emitting and receiving device according to a second embodiment of the present invention.

FIG. 17 is a perspective view of a laser coupler as the integrated light emitting and receiving device according to another embodiment of the present invention showing the area around the prism enlarged.

Note that the basic configuration of the integrated light emitting and receiving device according to the present embodiment is the same as the laser coupler explained in FIG. 6 and FIG. 7. Below, the same components are given the same reference numerals.

In the laser coupler shown in FIG. 17, the difference with the above first embodiment is that the photodetector 6 is substantially equally divided into two light receiving regions i and j along the recording track direction. The top surface of the prism 8 consists of a reflection face 8a and a non-reflection face 8b. The non-reflection face 8c formed on the top face of the prism 8 consists of a light transmitting film or an absorptive film. The reflected light from the photodetector 5 which is focused on the top face of the prism 8 is formed so as to straddle the boundary between the reflection face 8b and the non-reflection face 8c.

Accordingly, in the reflected light from the optical disc 1, the light striking the reflection face 8b is reflected on the photodetector 6.

Further, the focal point of the reflected light from the optical disc 1 in the transversal direction of the substrate 4 is set to be on the light receiving face of the photodetector 6.

Figure 18A:
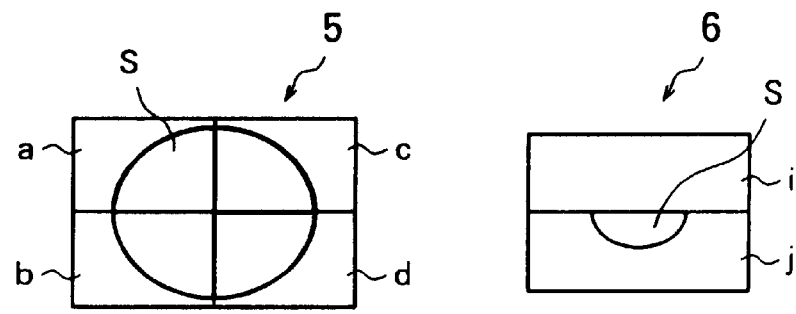
FIGS. 18A to 18C are views of the shape of a laser spot formed on the photodetectors 5 and 6 of the laser coupler according to the second embodiment.
Figure 18B:
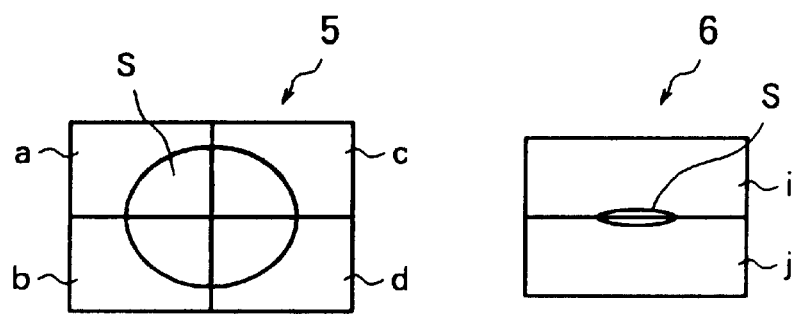
Figure 18C:
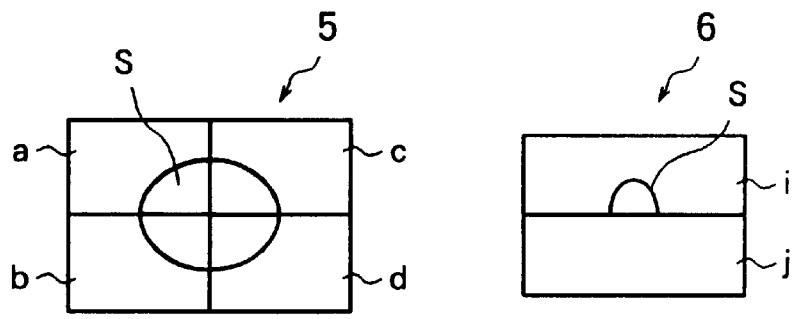

FIGS. 18A to 18C are views of shapes of the laser spots S formed on the photodetectors 5 and 6 of the above laser coupler. FIG. 18A shows a state where the recording face of the optical disc 1 on which the pits are formed is too near the object lens 2, FIG. 18B shows a state where the focal point of the object lens 2 is on the recording face of the optical disc 1 on which the pits are formed, and FIG. 18C shows a state where the recording face of the optical disc 1 on which the pits are formed is too far from the object lens 2.

As shown in FIG. 18B, in the state where the focal point of the object lens 2 is on the recording face of the optical disc 1 on which the pits are formed, the spot S is shaped to a line form along the line by which the photodetector 6 is divided, that is, the spot S is focused in the transversal direction and not focused in the longitudinal direction.

Further, in the state where the recording face of the optical disc 1 on which the pits are formed is too near to the object lens 2, a half oval shaped spot is formed only on the light receiving region j of the photodetector 6.

Further, in the state where the recording face of the optical disc 1 on which the pits are formed is too far from the object lens 2, a half oval shaped spot is formed only on the light receiving region i of the photodetector 6.

In the laser coupler according to the present embodiment, the tracking error signal TE is detected by the DPD method in the same way as the above first embodiment.

On the other hand, in the laser coupler according to the present embodiment, the focus error signal FE is detected by the so-called knife-edge method.

Specifically, the focus error signal FE is generated by the following equation (7) in accordance with the amount of received light detected by the photodetector 6. Note that the amounts of the received light of the light receiving regions i, j of the photodetector 6 are Mi, Mj.

$$FE=Mi-Nj \qquad (7)$$

That is, the amounts of received light of the light receiving regions i and j become substantially equal when focused, but only one of the amounts of received light of the light receiving regions i and j is increased when not focused.

Further, the polarity reverses when the focus is lost in the opposite direction.

As a result, it is possible to generate the focus error signal FE.

Figure 19:
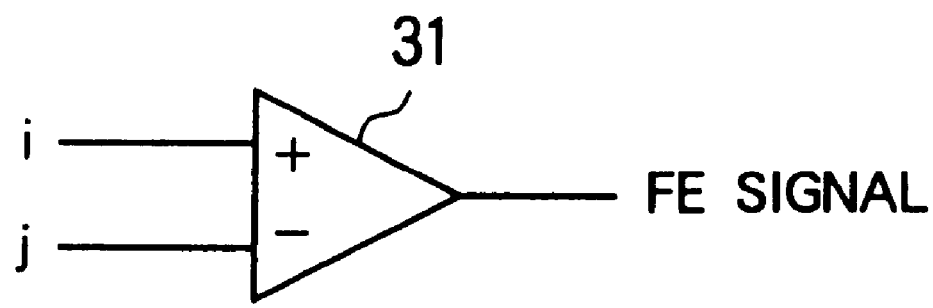
FIG. 19 is a view of an example of a circuit for generating a focus error signal by the knife-edge method.

Here, FIG. 19 shows a circuit for executing equation (7). This calculates the difference of the amounts of received light of the light receiving regions i, j of the photodetector 6 by the subtracter 31.

The circuit is formed for example on the semiconductor integrated circuit substrate 4.

As above mentioned, in the laser coupler according to the present embodiment, in addition to obtaining the same effect as the above first embodiment, it is possible to divide the photodetector 6 into two light receiving regions i and j and thereby reduce further the number of regions since the focus error signal can be obtained by the knife-edge method.

Third Embodiment

Figure 20:
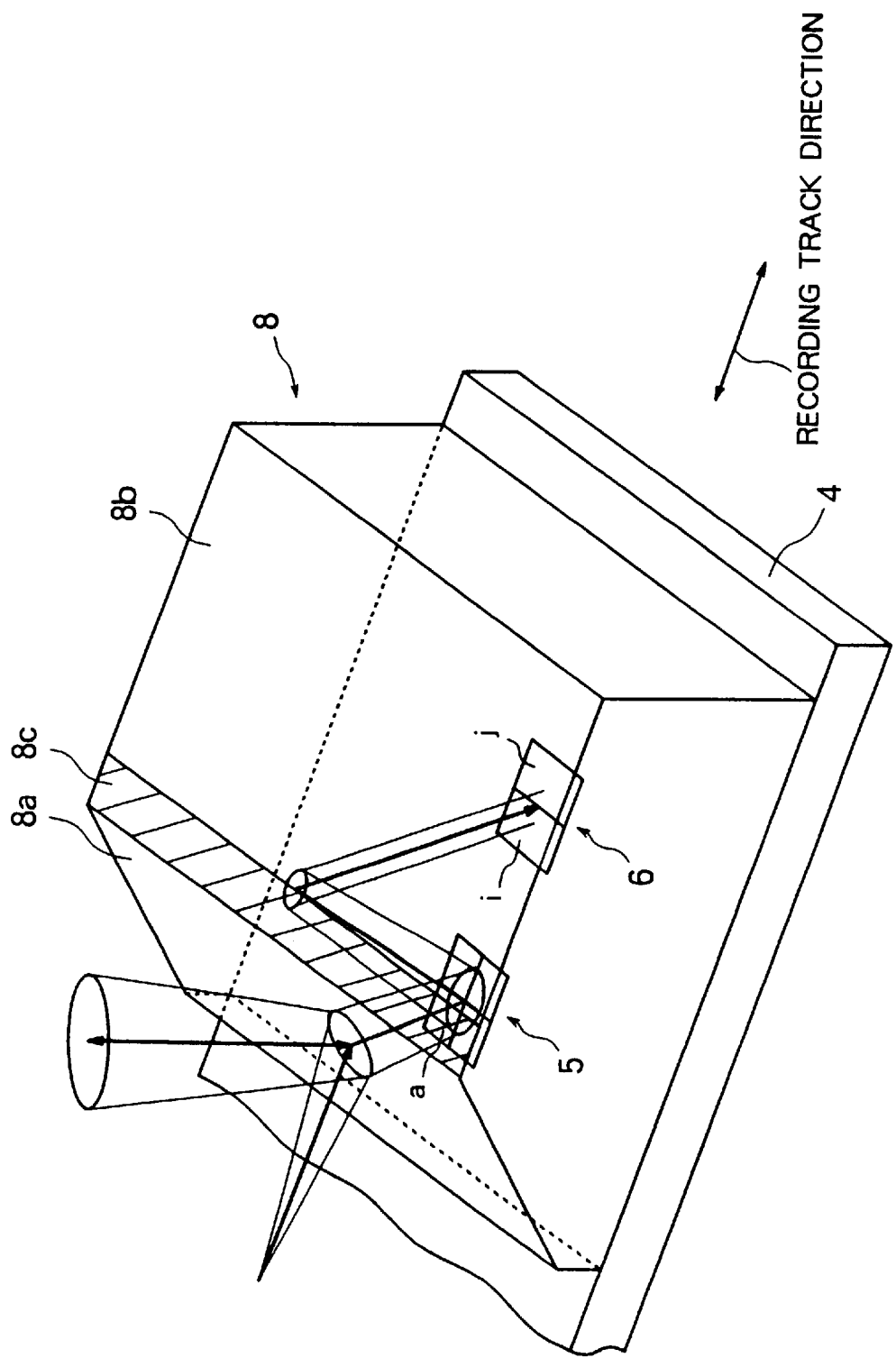
FIG. 20 is a perspective view of a laser coupler as an integrated light and receiving device according to a third embodiment of the present invention.

FIG. 20 is a perspective view of a laser coupler as an integrated light emitting and receiving device according to another embodiment of the present invention showing the area around the prism enlarged.

Note that the basic configuration of the present embodiment is the same as the laser coupler explained in FIG. 6 and FIG. 7. Below, the same components are given the same reference numerals.

As shown in FIG. 20, the differences between the laser couplers according to the present embodiment and the above second embodiment are that the photodetector 6 is divided substantially equally into the light receiving regions i, j along the vertical detection to the recording track and the direction of formation of the reflection surface 8b and the non-reflection surface 8c are different.

Further, the focal point of the reflected light from the disc 1 in the longitudinal direction of the semiconductor integrated circuit substrate 4 is set to be on the light receiving face of the photodetector 6.

In the present embodiment, in the same way as the above second embodiment, the tracking error signal TE is detected by the DPD method and the focus error signal FE is detected by the knife-edge method.

Figure 21A:
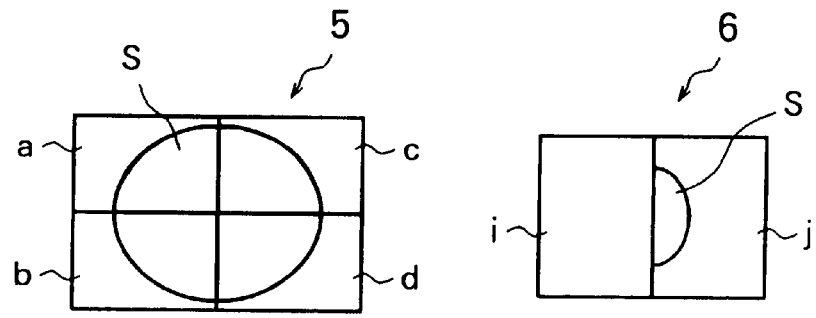
FIGS. 21A to 21C are views of the shapes of a laser spot formed on the photodetectors 5 and 6 of the laser coupler according to the third embodiment.
Figure 21B:
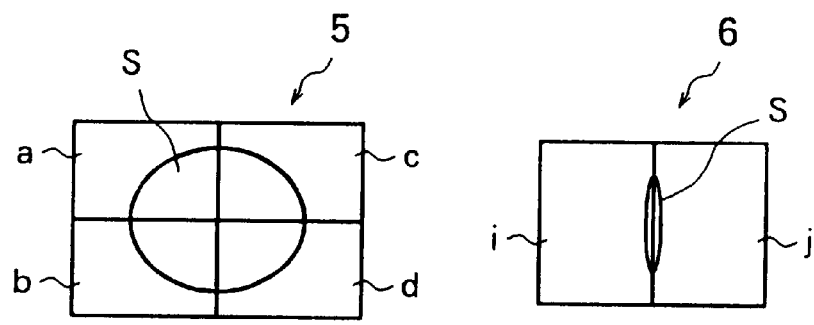
Figure 21C:
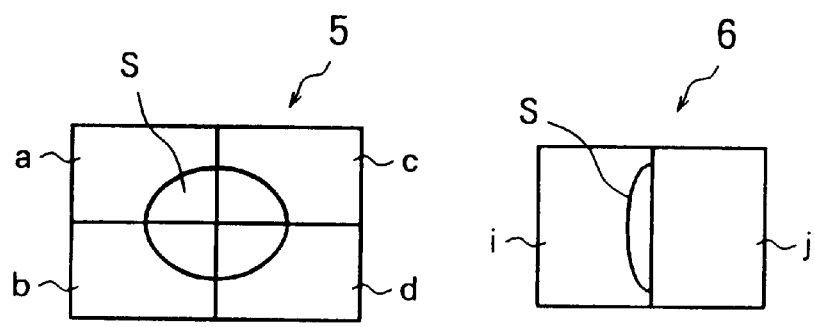

FIGS. 21A to 21C are views of the shape of the laser spot S formed on the photodetectors 5 and 6 of the above laser coupler. FIG. 21A shows the state where the recording face of the optical disc on which the pits are formed is too near the object lens 2, FIG. 21B shows the state where the focal point of the object lens 2 is on the recording face of the optical disc 1 on which the pits are formed, and FIG. 21C shows the state where the recording face of the optical disc 1 on which the pits are formed is too far from the object lens 2.

As shown in FIG. 21B, in the state where the focal point of the object lens 2 is on the recording face of the optical disc 1 on which the pits are formed, the spot S is set to be shaped as a line along the line by which the photodetector 6 is divided, that is, the spot is set to be focused in the longitudinal direction and not focused in the transversal direction.

Further, as shown in FIG. 21A, in the state where the recording face of the optical disc 1 on which the pits are formed is too near the object lens 2, a half oval shaped spot is formed only on the light receiving region j of the photodetector 6.

Further, as shown in FIG. 21C, in the state where the recording face of the optical disc 1 on which the pits are formed is too far from the object lens 2, a half oval shaped spot is formed only on the light receiving region i.

Fourth Embodiment

Figure 22:
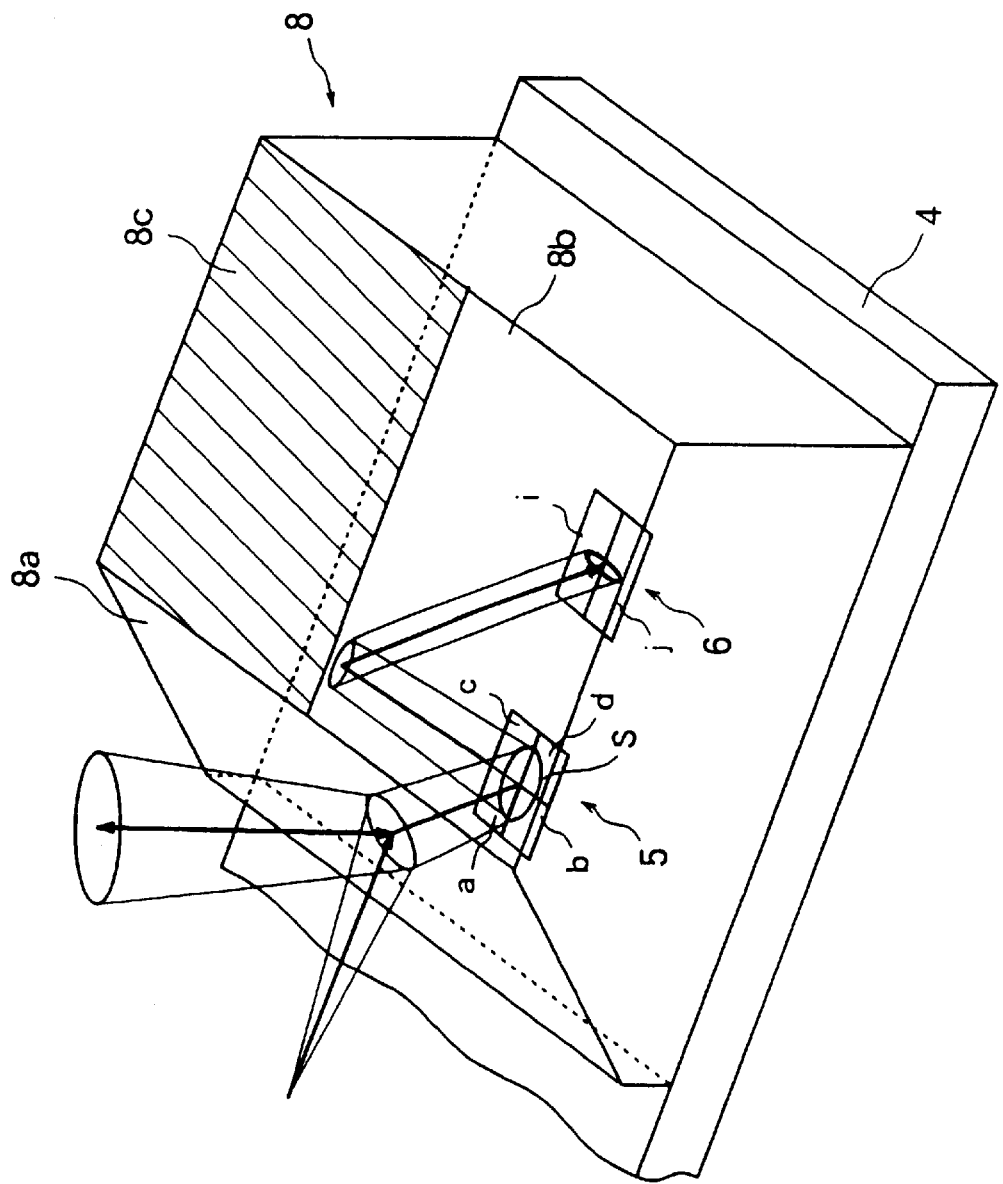
FIG. 22 is a perspective view of a laser coupler as an integrated light emitting and receiving device according to a fourth embodiment of the present invention.

FIG. 22 is a perspective view of a laser coupler as the integrated light emitting and receiving device according to another embodiment of the present invention showing the area around the prism enlarged.

Note that the basic configuration of the laser coupler according to the present embodiment is the same as the laser coupler as explained in FIG. 2 and FIG. 7. Below, the same components are given the same reference numerals.

The difference between the laser couplers according to the present embodiment and the second embodiment is that the focal point of the reflected light from the optical disc 1 in the transversal direction is set to be positioned at the reflection face 8b side near the boundary between the top face of the prism 8, that is, the reflection face 8b, and the non-reflection face 8c.

In the present embodiment, the spot S is, as shown in FIG. 23, formed on the photodetector 6.

In the state where the focal point of the object lens 2 is on the recording face of the optical disc on which the pits are formed, the spot S is set to be formed as a line along the boundary direction at the reflection portion near the boundary between the top face of the prism 8, that is, the reflection face, and non-reflection face.

Figure 23A:
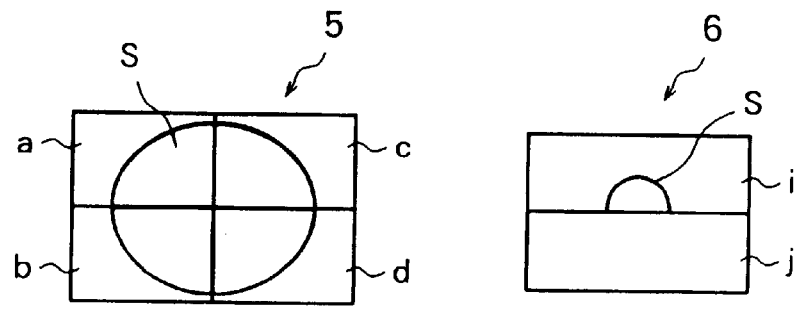
FIG. 23 is a view of the shape of a laser spot formed on the photodetectors 5 and 6 of the laser coupler according to the fourth embodiment.
Figure 23B:
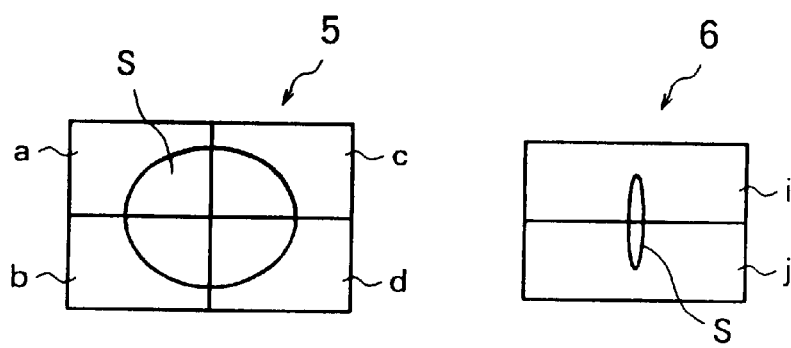

In this case, as shown in FIG. 23B, the spot S is shaped as a long line along with the vertical direction to the direction of the line by which the photodetector 6 is split.

Figure 23C:
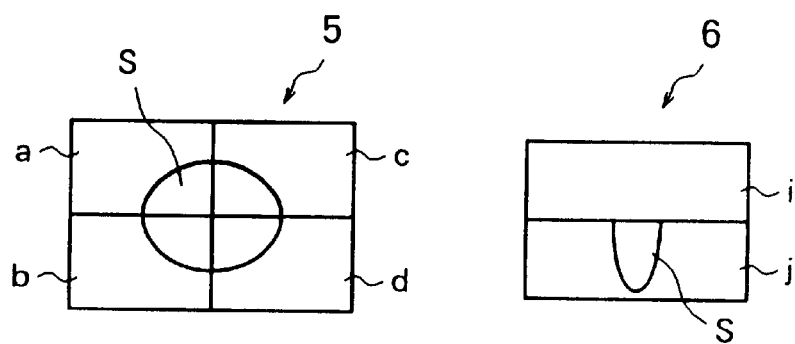
Figure 24A:
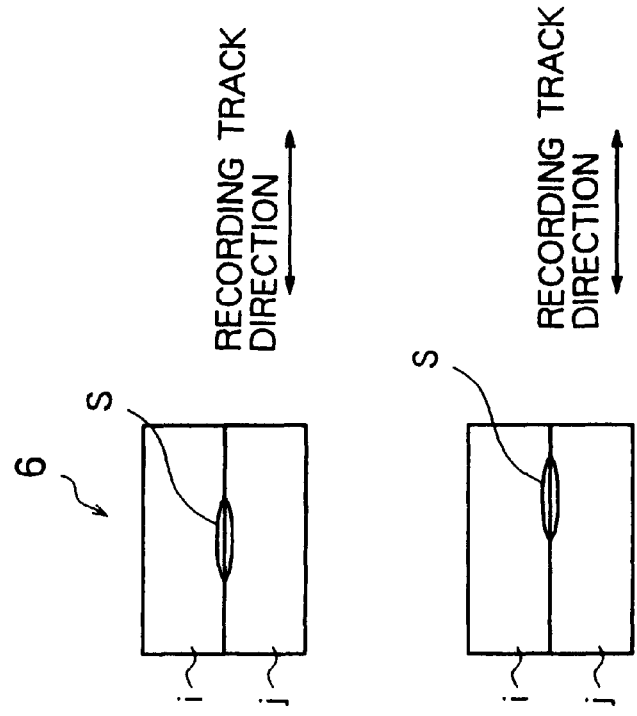
FIG. 24 is a view of movement of the position of formation of a laser spot on a photodetector due to a fluctuation in the height position of a light emitting point of a laser diode in the laser coupler according to the second embodiment.
Figure 24B:
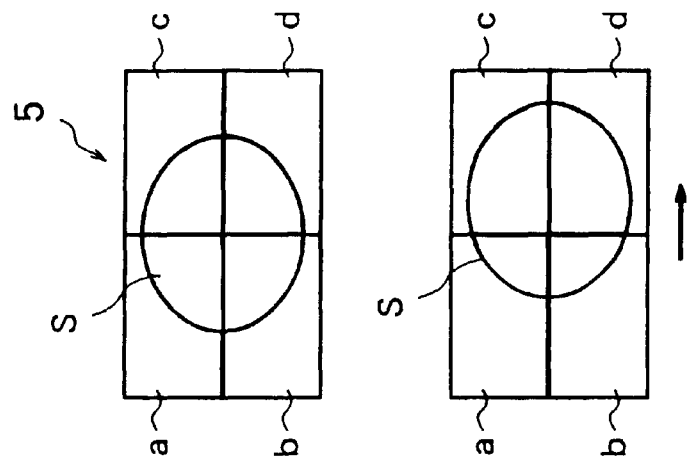

Further, as shown in FIG. 23A and FIG. 23C, in the state where the recording face of the optical disc 1 on which the pits are formed is too near the object lens 2, a half oval shaped spot is formed only on the light receiving region i of the photodetector 6.

In the state where the recording surface of the optical disc on which the pits are formed is too far the object lens 2, a half shaped spot is formed only on the light receiving region j of the photodetector 6 reverse to the above second embodiment.

According to the present invention, by providing the light receiving elements for generating the focus error signal and the tracking error signal, it is possible to reduce the numbers of the light receiving regions and simplify the circuit configuration for generating the focus error signal and the tracking error signal.

As a result, it becomes possible to reduce the size of the semiconductor integrated circuit substrate on which the light receiving elements are formed.

While the invention has been described with reference to specific embodiments chosen for purposes of illustration, it should be apparent that numerous modifications could be made thereto by those skilled in the art without departing from the basic concept and scope of the invention.

What is claimed is:

1. An integrated light emitting and receiving device for emitting light to a recording medium on which a plurality of pits are formed, focusing the light on the recording medium, receiving the reflected light influenced by the pits, and detecting a focus condition and tracking condition of the light focused on the recording medium in accordance with the information of the reflected light, said integrated light emitting and receiving device comprising:

first and second light receiving elements which are provided on a substrate and are divided into a plurality of light receiving regions;

a light emitting element which is provided on said substrate and emits light in a predetermined direction;

a light splitting means which is provided on said first and second light receiving elements, emits the light input from said light emitting element to said recording medium, focuses the reflected light from said recording medium onto said first light receiving element, and focuses the reflected light reflected from the first light receiving element onto said second light receiving element;

a tracking condition detecting means for detecting said tracking condition only from information on the amounts of light received by the light receiving regions of said first light receiving element; and a focus condition detecting means for detecting said focus condition only from information on the amounts of light received by the light receiving regions of said second light receiving element, wherein the second light receiving element is divided into four light receiving regions along two mutually crossing directions not along the longitudinal direction and transversal direction of said substrate.

2. An integrated light emitting and receiving device as set forth in claim 1, wherein said first light receiving element is divided into four light receiving regions along with the longitudinal direction and the transversal direction of said substrate.

3. An integrated light emitting and receiving device as set forth in claim 2, wherein said tracking condition detecting means detects the tracking condition by a phase comparing circuit for calculating a phase difference of a change of the amounts of light received between the light receiving regions located at diagonal positions among said four light receiving regions and an adding circuit for adding the phase differences of changes of the amounts of received light calculated by said phase comparing circuit.

4. An integrated light emitting and receiving device as set forth in claim 1, wherein said focus condition detecting means detects said focus condition by an adding circuit for calculating the sum of the amounts of received light of the light receiving regions of said second light receiving element located at diagonal positions among said four light receiving regions and a subtraction circuit for calculating the difference between said amounts of received light.

5. An integrated light emitting and receiving device as set forth in claim 1, wherein said light splitting means has a beam splitting face for reflecting the light emitted from said light emitting elements onto said recording medium and passing the reflected light from the recording medium and a reflection face for reflecting the reflected light of the light focused on said first light receiving element through said beam splitting face to said second light receiving element.

6. An integrated light emitting and receiving device as set forth in claim 5, wherein said light splitting means is formed by an optical member having a plurality of faces and made of a light transmissible material, said beam splitting face is formed on a face of said optical member having a plurality of faces facing the emitting direction of said light emitting element, and said reflection face is formed on a face of facing the face of said optical member mounted on said substrate.

7. An integrated light emitting and receiving device as set forth in claim 1, wherein a circuit for detecting said focus condition and tracking condition is formed on said substrate.

8. An optical pick-up emitting light to a recording medium on which a plurality of pits are formed, focusing light on the recording medium, receiving reflected light influenced by said pits, and detecting a focus condition and tracking condition of the light focused on the recording medium based on information of the reflected light, said optical pick-up comprising:

first and second light receiving elements which are provided on a substrate and are divided into a plurality of light receiving regions;

a light emitting element which is provided on said substrate and emits light in a predetermined direction;

a light splitting means which is provided on said first and second light receiving elements, emits the light input from said light emitting element to said recording medium, focuses the reflected light from said recording medium onto said first light receiving element, and focuses the reflected light reflected from the first light receiving element onto said second light receiving element;

a tracking condition detecting means for detecting said tracking condition only from information on the amounts of light received by the light receiving regions of said first light receiving element; and a focus condition detecting means for detecting said focus condition only from information on the amounts of light received by the light receiving regions of said second light receiving element, wherein said second light receiving element is divided into four light receiving regions along two directions mutually crossed not along the longitudinal direction and transversal direction of said substrate.

9. An optical pick-up as set forth in claim 8, wherein said first light receiving element is divided into four light receiving regions along the longitudinal direction and the transversal direction of said substrate.

10. An optical pick-up as set forth in claim 9, wherein said tracking condition detecting means detects the tracking condition by:

a phase comparing circuit for calculating a phase difference of a change of the amounts of received light between light receiving regions located at diagonal positions among said four light receiving regions and an adding circuit for adding the phase differences of changes of the amounts of received light calculated by said phase comparing circuit.

11. An optical pick-up as set forth in claim 8, wherein said focus condition detecting means detects said focus condition by an adding circuit for calculating a sum of amounts of received light of the light receiving regions of said second light receiving element located at diagonal positions among said four light receiving regions and a subtraction circuit for calculating a difference between said amounts of received light.

12. An optical pick-up as set forth in claim 8, wherein said light splitting means has a beam splitting face for reflecting the light emitted from said light emitting element onto said recording medium and passing th e reflected light from the recording medium and a reflection face for reflecting reflected light of the light focused on said first light receiving element through said beam splitting face to said second light receiving element.

13. An optical pick-up as set forth in claim 12, wherein said light splitting means is formed by an optical member having a plurality of faces and made of a light transmissible material, said beam splitting face is formed on a face of said optical member facing the emitting direction of said light emitting element, and said reflection face is formed on a face of facing the face of said optical member mounted on said substrate.

14. An optical pick-up as set forth in claim 8, wherein a circuit for detecting said focus condition and tracking condition is formed on said substrate.

* * * * *